(12) United States Patent
Yasuda

(10) Patent No.: US 9,349,012 B2
(45) Date of Patent: May 24, 2016

(54) DISTRIBUTED PROCESSING SYSTEM, DISTRIBUTED PROCESSING METHOD AND COMPUTER-READABLE RECORDING MEDIUM

(71) Applicant: NEC Corporation, Minato-ku, Tokyo (JP)

(72) Inventor: Junichi Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 13/736,473

(22) Filed: Jan. 8, 2013

(65) Prior Publication Data

US 2013/0185763 A1 Jul. 18, 2013

(30) Foreign Application Priority Data

Jan. 16, 2012 (JP) .................................. 2012-006167

(51) Int. Cl.
G06F 17/00 (2006.01)
G06F 21/57 (2013.01)

(52) U.S. Cl.
CPC .................................... *G06F 21/577* (2013.01)

(58) Field of Classification Search
CPC ............ H04L 63/1433; G06F 9/45558; G06F 9/5077; G06F 9/45533
See application file for complete search history.

(56) References Cited

U.S. PATENT DOCUMENTS

| 2008/0046960 A1* | 2/2008 | Bade et al. .......................... 726/1 |
| 2010/0169948 A1* | 7/2010 | Budko et al. ....................... 726/1 |
| 2010/0332889 A1* | 12/2010 | Shneorson et al. ............... 714/2 |

FOREIGN PATENT DOCUMENTS

JP 2011076504 A 4/2011

* cited by examiner

*Primary Examiner* — Nirav B Patel
*Assistant Examiner* — Mohammed Waliullah

(57) ABSTRACT

A distributed processing system 100 is used in which a plurality of machines including a virtual machine constructed by cloud computing perform distributed execution of a task. Machines 2 to 9 each include: a communication unit 302 that acquires environment information relating to the environment of another machine other than the own machine; an information acquisition unit 303 that acquires environment information relating to the environment of the own machine; a risk calculation unit 305 that calculates a risk for the case where the own machine executes the task based on the acquired environment information; a risk determination unit 306 that determines whether or not the calculated risk is equal to or higher than a predetermined threshold; and an execution control unit 307 that stops execution of the task on the own machine when the risk determination unit 306 determines that the risk is equal to or higher than the predetermined threshold.

12 Claims, 13 Drawing Sheets

FIG. 3

| BASIC INFORMATION | |
|---|---|
| POLICY ADMIN | MACHINE NAME: MACHINE 1<br>DOMAIN: XYZ |
| MASTER DISTRIBUTED EXECUTION FOUNDATION | MACHINE NAME: MACHINE 2<br>DOMAIN: ABC |
| EXECUTION ENVIRONMENT INFORMATION | H/W, OS, N/W, SECURITY POLICY |
| PROXIMITY ENVIRONMENT INFORMATION | NUMBER OF HOPS, RTT, VERSION, EXECUTED TASK |
| PROXIMITY CONDITION | MOST SIGNIFICANT 16 BITS IN IP ADDRESS ARE IDENTICAL |
| RISK ANALYSIS EQUATION | RISK ANALYSIS EQUATION 1: RISK COEFFICIENT = XX + XX + XX + XX |
| EXECUTION TIMING | EXECUTION ENVIRONMENT INFORMATION: EVERY HOUR<br>PROXIMITY ENVIRONMENT INFORMATION: EVERY 30 MINUTES<br>RISK ANALYSIS: UPON START OF TASK |
| RISK COEFFICIENT THRESHOLD | TASK 1: 10 |
| EXCEPTION INFORMATION | NONE |

FIG. 4

| EXECUTION ENVIRONMENT INFORMATION (MASTER MACHINE 2) |||||
|---|---|---|---|---|
| DATE AND TIME | H/W | OS | N/W | SECURITY POLICY |
| 2011/05/18 16:00:00 | CPU: 2 GHz<br>Memory: 2 GB<br>HDD: 1 TB<br>Machine: PHYSICAL | OS: Winxxxx<br>Version: 200<br>Revision: 1000 | IP address: 10.0.0.01<br>MAC address: FFFF01<br>Domain: XYZ | PROVIDER: IN-HOUSE<br>REGION: JAPAN<br>CONTRACT: NONE |
| 2011/05/18 15:00:00 | CPU: 2 GHz<br>Memory: 2 GB<br>HDD: 1 TB<br>Machine: PHYSICAL | OS: Winxxxx<br>Version: 200<br>Revision: 1000 | IP address: 10.0.0.01<br>MAC address: FFFF01<br>Domain: XYZ | PROVIDER: IN-HOUSE<br>REGION: JAPAN<br>CONTRACT: NONE |
| 2011/05/18 14:00:00 | CPU: 2 GHz<br>Memory: 2 GB<br>HDD: 1 TB<br>Machine: PHYSICAL | OS: Winxxxx<br>Version: 200<br>Revision: 1000 | IP address: 10.0.0.01<br>MAC address: FFFF01<br>Domain: XYZ | PROVIDER: IN-HOUSE<br>REGION: JAPAN<br>CONTRACT: NONE |

FIG. 5

| EXECUTION ENVIRONMENT INFORMATION (SLAVE MACHINE 4) | | | | |
|---|---|---|---|---|
| DATE AND TIME | H/W | OS | N/W | SECURITY POLICY |
| 2011/05/18 16:00:00 | CPU: 1 GHz<br>Memory: 2 GB<br>HDD: 1 TB<br>Machine: VIRTUAL | OS: Linxxxx<br>Version: 6<br>Revision: 1100 | IP address: 192.16B.0.11<br>MAC address: AAAAA<br>Domain: ABC | PROVIDER: CLOUD PROVIDER 1<br>REGION: JAPAN<br>CONTRACT: PREMIUM |
| 2011/05/18 15:00:00 | CPU: 1 GHz<br>Memory: 2 GB<br>HDD: 1 TB<br>Machine: VIRTUAL | OS: Linxxxx<br>Version: 6<br>Revision: 1100 | IP address: 192.16B.0.11<br>MAC address: AAAAA<br>Domain: ABC | PROVIDER: CLOUD PROVIDER 1<br>REGION: JAPAN<br>CONTRACT: PREMIUM |
| 2011/05/18 14:00:00 | CPU: 1 GHz<br>Memory: 2 GB<br>HDD: 1 TB<br>Machine: VIRTUAL | OS: Linxxxx<br>Version: 6<br>Revision: 1100 | IP address: 192.16B.0.11<br>MAC address: AAAAA<br>Domain: ABC | PROVIDER: CLOUD PROVIDER 1<br>REGION: JAPAN<br>CONTRACT: PREMIUM |

FIG. 6

| | | PROXIMITY ENVIRONMENT INFORMATION (SLAVE MACHINE 4) | | | |
|---|---|---|---|---|---|
| DATE AND TIME | POLICY ADMIN | MASTER DISTRIBUTED EXECUTION FOUNDATION | POLICY AGENT IN PROXIMITY | EXECUTED TASK IN PROXIMITY | RTT |
| 2011/05/18 16:00:00 | NUMBER OF HOPS: 5 AVERAGE RTT: 1000ms | POLICY AGENT 2b NUMBER OF HOPS: 5 AVERAGE RTT: 1000 ms Version: 00 EXECUTED TASKS: AA, BB, CC | POLICY AGENT 5b POLICY AGENT 6b ... POLICY AGENT 9b | TASK A TASK B | POLICY AGENT 5b: 10 ms POLICY AGENT 6b: 10 ms ... POLICY AGENT 9b: 100 ms |
| 2011/05/18 15:00:00 | NUMBER OF HOPS: 5 AVERAGE RTT: 1000ms | POLICY AGENT 2b NUMBER OF HOPS: 5 AVERAGE RTT: 1000 ms Version: 00 EXECUTED TASKS: AA, BB, CC | POLICY AGENT 5b POLICY AGENT 6b ... POLICY AGENT 9b | TASK A TASK B | POLICY AGENT 5b: 10 ms POLICY AGENT 6b: 10 ms ... POLICY AGENT 9b: 100 ms |
| 2011/05/18 14:00:00 | NUMBER OF HOPS: 5 AVERAGE RTT: 1000ms | POLICY AGENT 2b NUMBER OF HOPS: 5 AVERAGE RTT: 1000 ms Version: 00 EXECUTED TASKS: AA, BB, CC | POLICY AGENT 5b POLICY AGENT 6b ... POLICY AGENT 9b | TASK A TASK B | POLICY AGENT 5b: 10 ms POLICY AGENT 6b: 10 ms ... POLICY AGENT 9b: 100 ms |

FIG. 7

| | PROXIMITY ENVIRONMENT INFORMATION (SLAVE MACHINE 4) | | | |
|---|---|---|---|---|
| POLICY ADMIN | MASTER DISTRIBUTED EXECUTION FOUNDATION | POLICY AGENT IN PROXIMITY | EXECUTED TASK IN PROXIMITY | RTT |
| NUMBER OF HOPS: 5 AVERAGE RTT: 1000ms | POLICY AGENT 2b NUMBER OF HOPS: 5 AVERAGE RTT: 1000 ms Version: 00 EXECUTED TASKS: AA, BB, CC | POLICY AGENT 5b ... POLICY AGENT 9b | TASK A TASK B | POLICY AGENT 5b: 10 ms ... POLICY AGENT 9b: 100 ms |

FIG. 8

| | PROXIMITY ENVIRONMENT INFORMATION (SLAVE MACHINE 5) | | | |
|---|---|---|---|---|
| POLICY ADMIN | MASTER DISTRIBUTED EXECUTION FOUNDATION | POLICY AGENT IN PROXIMITY | EXECUTED TASK IN PROXIMITY | RTT |
| NUMBER OF HOPS: 5 AVERAGE RTT: 1000ms | POLICY AGENT 2b NUMBER OF HOPS: 5 AVERAGE RTT: 1000 ms Version: 00 EXECUTED TASKS: AA, BB, CC | POLICY AGENT 4b ... POLICY AGENT 9b | TASK A TASK B | POLICY AGENT 4b: 10 ms ... POLICY AGENT 9b: 100 ms |

FIG. 9

| | PROXIMITY ENVIRONMENT INFORMATION (SLAVE MACHINE 9) | | | |
|---|---|---|---|---|
| POLICY ADMIN | MASTER DISTRIBUTED EXECUTION FOUNDATION | POLICY AGENT IN PROXIMITY | EXECUTED TASK IN PROXIMITY | RTT |
| NUMBER OF HOPS: 6 AVERAGE RTT: 1000ms | POLICY AGENT 2b NUMBER OF HOPS: 10 AVERAGE RTT: 2000 ms Version: 00 EXECUTED TASKS: AA, BB, CC | POLICY AGENT 4b ... POLICY AGENT 8b | TASK A TASK B | POLICY AGENT 4b: 100 ms ... POLICY AGENT 8b: 100 ms |

FIG. 10

| POLICY AGENT INFORMATION (MASTER MACHINE 2) | | | | | | |
|---|---|---|---|---|---|---|
| POLICY AGENT | EXECUTION ENVIRONMENT INFORMATION | | | | PROXIMITY ENVIRONMENT INFORMATION | |
| | H/W | OS | N/W | SECURITY POLICY | MASTER DISTRIBUTED EXECUTION FOUNDATION | RTT |
| POLICY AGENT 2b | CPU: 2 GHz<br>Memory: 2 GB<br>HDD: 1 TB<br>Machine: PHYSICAL | OS: Winxxx<br>Version: 200<br>Revision: 1000 | IP address: 10.0.0.01<br>MAC address: FFFF01<br>Domain: XYZ | PROVIDER: IN-HOUSE<br>REGION: JAPAN<br>CONTRACT: NONE | — | 0 ms |
| POLICY AGENT 3b | CPU: 2 GHz<br>Memory: 2 GB<br>HDD: 1 TB<br>Machine: PHYSICAL | OS: Winxxx<br>Version: 200<br>Revision: 1000 | IP address: 10.0.0.02<br>MAC address: FFFF02<br>Domain: XYZ | PROVIDER: IN-HOUSE<br>REGION: JAPAN<br>CONTRACT: NONE | NUMBER OF HOPS: 1<br>AVERAGE RTT: 1 ms<br>Version: 00<br>EXECUTED TASKS: AA | POLICY AGENT 2b: 10 ms |
| POLICY AGENT 4b | CPU: 1 GHz<br>Memory: 2 GB<br>HDD: 1 TB<br>Machine: VIRTUAL | OS: Linxxx<br>Version: 6<br>Revision: 1100 | IP address: 192.16B.0.11<br>MAC address: AAAA11<br>Domain: ABC | PROVIDER: CLOUD<br>PROVIDER 1<br>REGION: JAPAN<br>CONTRACT: PREMIUM | NUMBER OF HOPS: 5<br>AVERAGE RTT: 10 ms<br>Version: 00<br>EXECUTED TASKS: AA, BB | POLICY AGENT 5b: 10 ms<br>POLICY AGENT 6b: 10 ms<br>...<br>POLICY AGENT 9b: 100 ms |
| POLICY AGENT 5b | CPU: 1 GHz<br>Memory: 2 GB<br>HDD: 1 TB<br>Machine: VIRTUAL | OS: Linxxx<br>Version: 6<br>Revision: 1100 | IP address: 192.16B.0.12<br>MAC address: AAAA12<br>Domain: ABC | PROVIDER: CLOUD<br>PROVIDER 1<br>REGION: JAPAN<br>CONTRACT: PREMIUM | NUMBER OF HOPS: 5<br>AVERAGE RTT: 10 ms<br>Version: 00<br>EXECUTED TASKS: AA, BB | POLICY AGENT 4b: 10 ms<br>POLICY AGENT 6b: 10 ms<br>...<br>POLICY AGENT 9b: 100 ms |
| ... | | | | | | |
| POLICY AGENT 9b | CPU: 1 GHz<br>Memory: 2 GB<br>HDD: 1 TB<br>Machine: VIRTUAL | OS: Linxxx<br>Version: 6<br>Revision: 1100 | IP address: 192.16B.0.16<br>MAC address: AAAA16<br>Domain: ABC | PROVIDER: CLOUD<br>PROVIDER 1<br>REGION: JAPAN<br>CONTRACT: DISCOUNT | NUMBER OF HOPS: 10<br>AVERAGE RTT: 100 ms<br>Version: 00<br>EXECUTED TASKS: AA, BB | POLICY AGENT 4b: 1000 ms<br>...<br>POLICY AGENT 8b: 1000 ms |

DISTRIBUTED PROCESSING SYSTEM, DISTRIBUTED PROCESSING METHOD AND COMPUTER-READABLE RECORDING MEDIUM

CROSS-REFERENCE TO RELATED APPLICATION

This application is based upon and claims the benefit of priority from Japanese patent application No. 2012-006167, filed on Jan. 16, 2012, the disclosure of which is incorporated herein in its entirety by reference.

BACKGROUND OF THE INVENTION

1. Field of the Invention

The present invention relates to a distributed processing system, a distributed processing method and a computer-readable recording medium.

2. Background Art

JP 2011-076504A discloses a distributed processing system that makes use of a virtual machine constructed by cloud computing. More specifically, the distributed processing system disclosed in the above document includes a virtual machine in addition to in-house machines. In this way, even when a large amount of processing has to be executed temporarily, the distributed processing system disclosed in the above document can address the situation flexibly by expanding the resources provided by a cloud provider as necessary without augmenting the in-house machines.

Incidentally, some distributed processing systems classify machines that execute distributed processing into a master and slaves. In the distributed processing systems that distinguish between a master and slaves, the master divides batch processing and requests the slaves to execute the divided batch processing. Therefore, in the case where a virtual machine provided by a cloud provider is set as a slave in a distributed processing system, the virtual machine performs distributed execution of a task.

In general, cloud providers retain a large number of machines in a data center to provide users with virtual machines, and automatically allocate the resources of the machines to the virtual machines. Furthermore, some cloud providers retain a large number of machines in data centers around the world. It is therefore difficult for the administrators of distributed processing systems to keep track of which machine is executing processing.

However, companies of users of distributed processing systems attempt to prevent leakage of classified information by, for example, setting security policies and concluding service-level contracts. It is thus required to keep track of which machine is executing processing. Hence, even in the case where a virtual machine is set as a slave, it is necessary to prevent execution of processing on a machine that is not desired by an administrator so as to avoid breach of security policies and contracts at the companies of the users.

The distributed processing system disclosed in the above document also uses a virtual machine and therefore has the possibility that processing is executed on a machine that is not desired by an administrator, resulting in breach of users' security policies and contracts.

SUMMARY OF THE INVENTION

An exemplary object of the present invention is to solve the above problem and to provide a distributed processing system, a distributed processing method and a computer-readable recording medium that can prevent execution of processing on a machine that is not desired by an administrator.

In order to achieve the above object, a distributed processing system according to one aspect of the present invention includes a plurality of machines that perform distributed execution of a task. Each machine includes: a communication unit that acquires environment information relating to an environment of another machine other than the own machine; an information acquisition unit that acquires environment information relating to an environment of the own machine; a risk calculation unit that calculates a risk for a case where the own machine executes the task based on the acquired environment information of another machine and the acquired environment information of the own machine; a risk determination unit that determines whether or not the calculated risk is equal to or higher than a predetermined threshold; and an execution control unit that stops execution of the task on the own machine when the risk determination unit determines that the risk is equal to or higher than the predetermined threshold.

Furthermore, in order to achieve the above object, a distributed processing method according to one aspect of the present invention performs distributed execution of a task using a plurality of machines and includes: (a) a step in which each of the plurality of machines acquires environment information relating to an environment of another machine other than the own machine; (b) a step in which each of the plurality of machines acquires environment information relating to an environment of the own machine; (c) a step in which each of the plurality of machines calculates a risk for a case where the own machine executes the task based on the environment information acquired in step (a) and the environment information acquired in step (b); (d) a step in which each of the plurality of machines determines whether or not the risk calculated in step (c) is equal to or higher than a predetermined threshold; and (e) a step in which each of the plurality of machines stops execution of the task on the own machine when step (d) determines that the risk is equal to or higher than the predetermined threshold.

Moreover, in order to achieve the above object, a computer-readable recording medium according to one aspect of the present invention has recorded therein a program for, when performing distributed execution of a task using a plurality of computers, causing one of the plurality of computers to execute the divided task. The program includes an instruction for causing one of the plurality of computers to execute: (a) a step of acquiring environment information relating to an environment of another computer other than the own computer; (b) a step of acquiring environment information relating to an environment of the own computer; (c) a step of calculating a risk for a case where the own computer executes the task based on the environment information acquired in step (a) and the environment information acquired in step (b); (d) a step of determining whether or not the calculated risk is equal to or higher than a predetermined threshold; and (e) a step of stopping execution of the task on the own computer when step (d) determines that the risk is equal to or higher than the predetermined threshold.

The present invention with the above features can prevent execution of processing on a machine that is not desired by an administrator.

BRIEF DESCRIPTION OF THE DRAWINGS

FIG. 3 shows an example of a data structure of basic information used in the embodiment.

FIG. 4 shows an example of a data structure of execution environment information of a master machine used in the embodiment.

FIG. 5 shows an example of a data structure of execution environment information of a slave machine used in the embodiment.

FIG. 6 shows an example of a data structure of proximity environment information of a slave machine acquired by the slave machine in the embodiment.

FIG. 7 shows an example of a data structure of proximity environment information that is acquired from a slave machine 4 by another machine in the embodiment.

FIG. 8 shows an example of a data structure of proximity environment information that is acquired from a slave machine 5 by another machine in the embodiment.

FIG. 9 shows an example of a data structure of proximity environment information that is acquired from a slave machine 9 by another machine in the embodiment.

FIG. 10 shows an example of a data structure of policy agent information used in the embodiment.

EXEMPLARY EMBODIMENT

Embodiment

The following describes a preferred embodiment of a distributed processing system, a distributed processing method and a distributed processing program according to the present invention with reference to the attached drawings.

[General Configuration of System]

Figure 1:
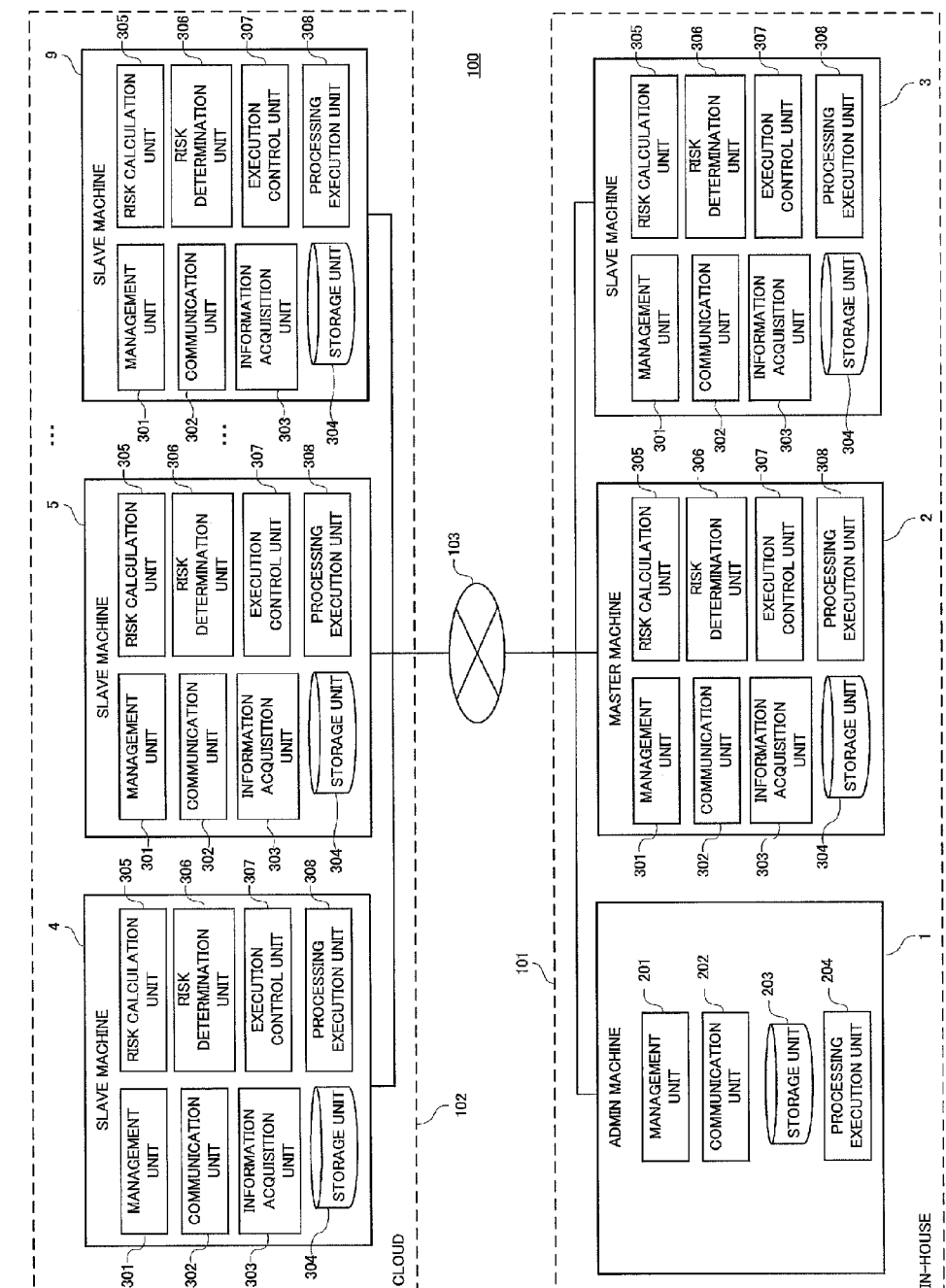
FIG. 1 is a block diagram showing the functions and configurations of a distributed processing system and machines according to an embodiment of the present invention.

First, a description is given of a configuration of a distributed processing system according to the present embodiment with reference to FIG. 1. FIG. 1 is a block diagram showing the functions and configurations of a distributed processing system and machines according to an embodiment of the present invention. As shown in FIG. 1, in the present embodiment, a distributed processing system 100 includes an in-house system 101 and a cloud system 102 that can be connected to each other via the Internet 103.

The in-house system 101 includes physical machines 1 to 3, which are physical computers. The cloud system 102 includes virtual machines 4 to 9, which are logical computers constructed by cloud computing.

The machines 1 to 9 may each be arbitrarily constructed as either a physical machine or a virtual machine. Also, the number of machines that are set as slaves may be arbitrarily set. Furthermore, no specific limitation is imposed on the hardware configuration and the type of an operating system (OS) of the machines 1 to 9. Moreover, the configurations of the machines 6 to 8 are omitted from FIG. 1 because the machines 6 to 8 are configured in a manner similar to the machines 4, 5 and 9.

Out of the machines 1 to 9, the machine 1 is used by an administrator to manage other machines and hereinafter may be referred to as "admin machine". The machine 2 serves as a master with respect to the machines 3 to 9 and hereinafter may be referred to as "master machine". The master machine 2 divides batch processing into a plurality of tasks and distributes the divided tasks to the machines 3 to 9. The machines 3 to 9 are slave machines and execute the tasks distributed by the master machine 2.

[Machine Functions and Configurations]

A description is now given of machine functions and configurations. The machine functions and configurations shown in FIG. 1 vary among the admin machine 1, the master machine 2 and the slave machines 3 to 9.

As shown in FIG. 1, in the present embodiment, the admin machine 1 includes a management unit 201, a communication unit 202, a storage unit 203 and a processing execution unit 204.

The management unit 201 manages the communication unit 202 and the processing execution unit 204. The communication unit 202 communicates with communication units in other machines and exchanges various types of information with other machines. The storage unit 203 stores basic information (see FIG. 3 described later), execution environment information (see FIGS. 4 and 5 described later) and proximity environment information (see FIGS. 6 to 9 described later), which are used in other machines for risk analysis described later. The processing execution unit 204 controls distributed processing in other machines 2 to 9 using the information stored in the storage unit 203.

As shown in FIG. 1, the master machine 2 and the slave machines 3 to 9 each include a communication unit 302, an information acquisition unit 303, a risk calculation unit 305, a risk determination unit 306 and an execution control unit 307.

The communication unit 302 acquires environment information relating to the environment of another machine other than the own machine that includes the communication unit 302. The information acquisition unit 303 acquires environment information relating to the environment of the own machine. Based on the acquired environment information of the own machine and environment information of another machine, the risk calculation unit 303 calculates the risk for the case where the own machine executes a task.

The risk determination unit 306 determines whether or not the risk calculated by the risk calculation unit 305 is equal to or higher than a predetermined threshold. When the risk determination unit 306 determines that the risk is equal to or higher than the predetermined threshold, the execution control unit 307 stops the execution of the task on the own machine. On the other hand, when the risk determination unit 306 determines that the risk is lower than the predetermined threshold, the execution control unit 307 permits the execution of the task on the own machine.

As described above, in the present embodiment, any machine other than the admin machine 1 can calculate the risk for the case where the own machine executes a task and stop the execution of the task depending on the result of the calculation. Accordingly, the present embodiment can prevent the execution of processing on a machine that is not desired by the administrator.

The following is a more specific description of the configuration of the machines 3 to 9. In the present embodiment, environment information includes execution environment information and proximity environment information. The execution environment information identifies the environment of the corresponding machine. The proximity environment information identifies the environment of another machine that satisfies a predetermined proximity condition in relation to the corresponding machine.

Furthermore, as shown in FIG. 1, the master machine 2 and the slave machines 3 to 9 according to the present embodiment each include a management unit 301, a storage unit 304 and a processing execution unit 308 in addition to the communication unit 302, the information acquisition unit 303, the risk calculation unit 305, the risk determination unit 306 and the execution control unit 307.

The processing execution unit 308 executes task processing. More specifically, in the master machine 2, the processing execution unit 308 divides a plurality of tasks included in single batch processing and distributes the divided tasks to the processing execution units 308 in the slave machines 3 to 9. On the other hand, in the slave machines 3 to 9, the processing execution units 308 process the distributed tasks.

The management unit 301 manages the communication unit 302, the information acquisition unit 303, the storage unit 304, the risk calculation unit 305, the risk determination unit 306, the execution control unit 307 and the processing execution unit 308 in the own machine that includes the management unit 301. For example, the management unit 301 sets the interval at which the execution environment information is acquired, a method for exchanging the proximity environment information, and the like based on the basic information, and controls the execution of processing therefor.

In the present embodiment, the communication unit 302 communicates with the communication units 202 and 302 in machines other than the own machine. For example, the communication unit 302 searches for and identifies another machine that is located in proximity to the own machine (specifically, a policy agent in another machine (see FIG. 2)) by way of broadcast, multicast, etc. Then, the communication unit 302 acquires, from the communication unit 202 in the admin machine 1 (specifically, a policy admin (see FIG. 2)), the environment information of the identified another machine, namely the execution environment information and the proximity environment information stored in the policy agent in the identified another machine (see FIG. 2).

In the present embodiment, the information acquisition unit 303 acquires the execution environment information and the proximity environment information stored in the own machine. More specifically, the information acquisition unit 303 acquires the execution environment information and the proximity environment information stored in the own machine based on an execution timing (see FIG. 3 described later) included in the basic information transmitted from the communication unit 202 in the admin machine 1.

The storage unit 304 stores various types of information, such as the basic information, the execution environment information and the proximity environment information. As the execution environment information and the proximity environment information of the own machine are generated as needed based on the basic information, the storage unit 304 accumulates them as history information in units of dates and times. Furthermore, in the present embodiment, the storage unit 304 generates policy agent information (see FIG. 10 described later) from the execution environment information and the proximity environment information of the own machine and the execution environment information and the proximity environment information of other machines, and stores these pieces of environment information as policy agent information.

In the present embodiment, the risk calculation unit 305 calculates the risk for the case where the own machine executes a task based on the basic information, the execution environment information and the proximity environment information stored in the storage unit 304.

Furthermore, in the present embodiment, the risk determination unit 306 determines whether or not the calculated risk coefficient is equal to or larger than a threshold (see FIG. 3 described later) included in the basic information transmitted from the communication unit 202 in the admin machine 1.

Moreover, in the present embodiment, when it is determined that the risk coefficient is equal to or larger than the threshold, the execution control unit 307 instructs the processing execution unit 308 in the own machine to stop the execution of the task. On the other hand, when it is determined that the risk is lower than the threshold, the execution control unit 307 permits the processing execution unit 308 in the own machine to execute the task.

[Specific Configurations of System and Machines]

Figure 2:
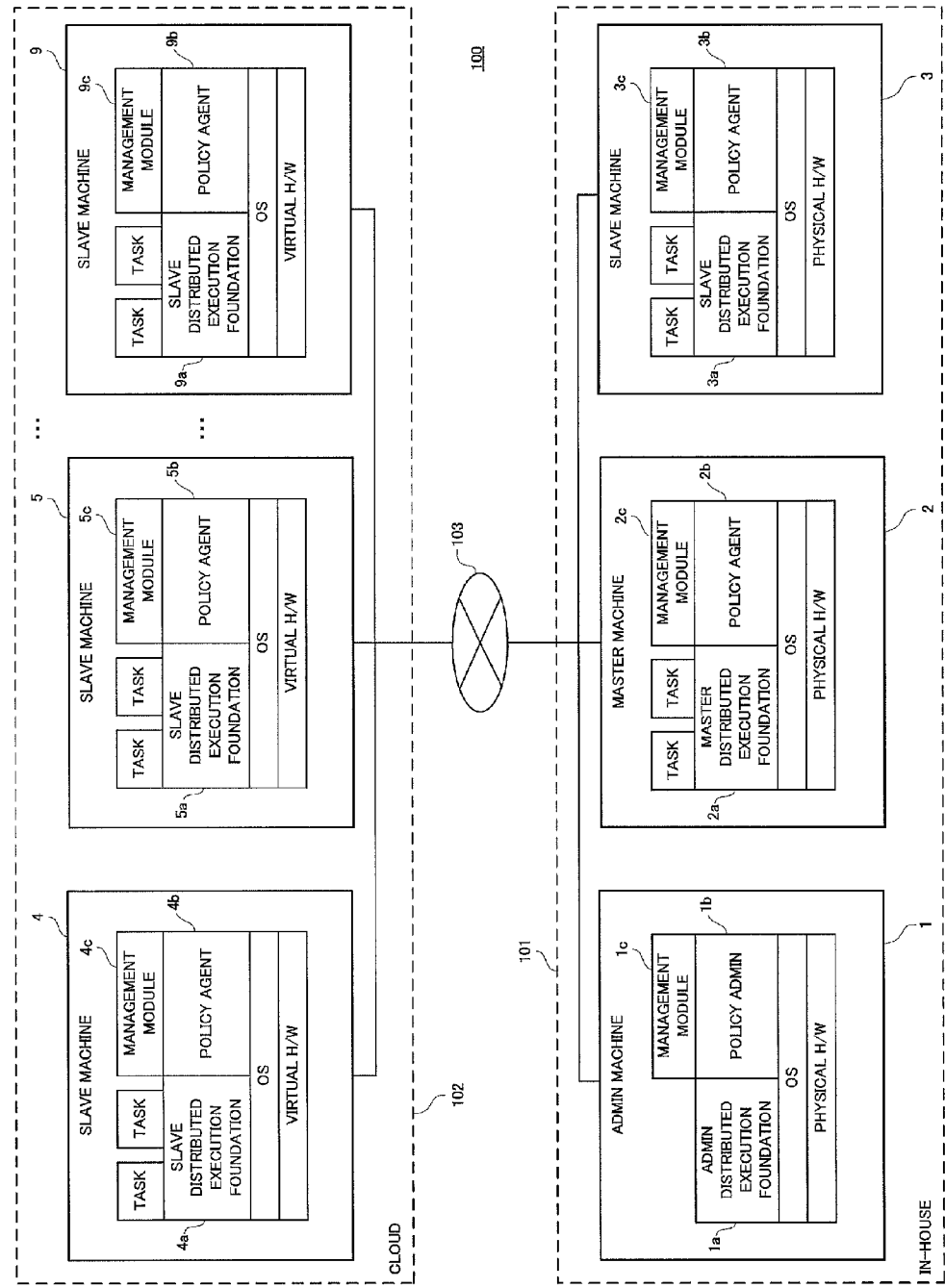
FIG. 2 is a block diagram showing the specific configurations of the distributed processing system and machines shown in FIG. 1.

The following describes specific examples of the distributed processing system 100 according to the present embodiment and machines constituting the distributed processing system 100 with reference to FIG. 2. FIG. 2 is a block diagram showing the specific configurations of the distributed processing system and machines shown in FIG. 1.

As shown in FIG. 2, middleware for executing distributed processing is installed on each of the machines 1 to 9. This middleware makes up a distributed execution foundation which functions as the processing execution unit shown in FIG. 1. In each of the machines 1 to 9, processing is executed through the operations of the distributed execution foundation. There are three types of distributed execution foundation: administration (hereinafter referred to as "admin"), master, and slave.

To be more specific, in the example of FIG. 2, an admin distributed execution foundation 1a is constructed in the admin machine 1. The distributed execution foundation 1a functions as the processing execution unit 204 shown in FIG. 1. Similarly, a master distributed execution foundation 2a is constructed in the master machine 2. The distributed execution foundation 2a functions as the processing execution unit 308 in the master machine 2 shown in FIG. 1. Similarly, slave distributed execution foundations 3a to 9a are constructed in the slave machines 3 to 9. The distributed execution foundations 3a to 9a function as the processing execution units 308 in the slave machines shown in FIG. 1.

The admin distributed execution foundation 1a stores information (machine information) of all of the master distributed execution foundation 2a and the slave distributed execution foundations 3a to 9a, and controls these distributed execution foundations 2a to 9a.

The master distributed execution foundation 2a processes a plurality of tasks included in batch processing. Specifically, the master distributed execution foundation 2a divides a plurality of tasks included in single batch processing, distributes the divided tasks to the slave distributed execution foundations 3a to 9a, and causes the slave distributed execution foundations 3a to 9a to execute the distributed tasks.

The slave distributed execution foundations 3a to 9a process the tasks received from the master distributed execution foundation 2a.

Software for executing distributed processing in collaboration with the distributed execution foundation 1a is installed on the main machine 1. This software makes up a policy administrator (hereinafter referred to as "policy admin") 1b.

Also, software for executing distributed processing in collaboration with the distributed execution foundation in the own machine is installed on each of the master machine 2 and the slave machines 3 to 9. This software makes up policy agents 2b to 9b. For example, the policy admin 1b and the policy agents 2b to 9b have functions of collaborating with the distributed execution foundations, acquiring information of the distributed execution foundations, and controlling the operations of the distributed execution foundations.

More specifically, the policy admin 1b functions as the communication unit 202 shown in FIG. 1, and stores the basic information that is used by the policy agents 2b to 9b when conducting the risk analysis. The basic information is arbitrarily set by the administrator. The policy admin 1b also distributes the basic information to the policy agents 2b to 9b. This controls the operations of the policy agents 2b to 9b.

The policy agents 2b to 9b function as the execution control units 307 shown in FIG. 1 and control the execution of tasks by the distributed execution foundations 2a to 9a. Therefore, the distributed execution foundations 2a to 9a execute the tasks after the execution has been permitted by the policy agents 2b to 9b. The policy agents 2b to 9b also function as the information acquisition units 303 shown in FIG. 1. Each of the policy agents 2b to 9b acquires the execution environment information and the proximity environment information of the machine in which it is constructed (the own machine) based on the distributed basic information.

The policy agents 2b to 9b further function as the communication units 302 shown in FIG. 1, and communicate with other policy agents so as to exchange various types of information, such as the execution environment information and the proximity environment information, with other policy agents. The policy agents 2b to 9b further function as the risk calculation units 305 and the risk determination units 306 shown in FIG. 1, and analyze the risk using the basic information, the execution environment information and the proximity environment information.

In addition to executing the aforementioned processing, the policy admin 1b also acquires various types of information stored in the policy agents 2b to 9b, such as the execution environment information and the proximity environment information. The policy admin 1b stores the acquired various types of information and uses them to control the policy agents 2b to 9b.

As set forth above, as shown in FIG. 2, the admin distributed execution foundation 1a and the policy admin 1b are constructed in the admin machine 1. The master distributed execution foundation 2a and the policy agent 2b are constructed in the master machine 2. Furthermore, one of the slave distributed execution foundations 3a to 9a and one of the policy agents 3b to 9b are constructed in each of the slave machines 3 to 9.

Furthermore, as shown in FIG. 2, management modules that function as the management units shown in FIG. 1 are installed on the machines 1 to 9. More specifically, in the admin machine 1, a management module 1c functions as the management unit 204 shown in FIG. 1 and manages the distributed execution foundation 1a and the policy admin 1b in the admin machine 1.

In the master machine 2, a management module 2c functions as the management unit 301 in the master machine 2 shown in FIG. 1. In the slave machines 3 to 9, management modules 3c to 9c function as the management units 301 in the slave machines 3 to 9 shown in FIG. 1. Each of the management modules 2c to 9c in the master machine 2 and the slave machines 3 to 9 manages the distributed execution foundation and the policy agent in the own machine.

Furthermore, a storage device (not shown in FIG. 2) provided in the admin machine 1, such as a memory, functions as the storage unit 203 shown in FIG. 1. Moreover, storage devices (not shown in FIG. 2) provided in the master machine 2 and the slave machines 3 to 9, such as memories, function as the storage units 304 shown in FIG. 1.

[Basic Information]

A specific description of the aforementioned basic information is provided below with reference to FIG. 3. FIG. 3 shows an example of basic information used in the present embodiment. For example, the basic information includes, as data items, "policy admin", "master distributed execution foundation", "execution environment information", "proximity environment information", "proximity condition", "risk analysis equation", "execution timing", "risk coefficient threshold", and "exception information".

The data item "policy admin" holds information relating to the admin machine operated by the policy admin. The data item "master distributed execution foundation" holds information relating to the master machine operated by the master distributed execution foundation. The data item "execution environment information" holds information for identifying data items in the execution environment information managed by the master machine and the slave machines. The execution environment information relates to the execution environments of the machines. Specifics of the execution environment information will be described later.

The data item "proximity environment information" holds information for identifying data items in the proximity environment information managed by the master machine and the slave machines. The proximity environment information relates to the environments of machines located in proximity that satisfy a proximity condition. Specifics of the proximity environment information will be described later. The data item "proximity condition" holds a proximity condition for identifying machines located in proximity. One example of the proximity condition is "the most significant 16 bits in the IP address are identical".

The data item "risk analysis equation" holds an equation used when analyzing the risk for each machine (risk analysis equation). The risk analysis equation may be arbitrarily set by the administrator. A plurality of risk analysis equations may be set in correspondence with the specifics of risks. The following Expression 1 shows a specific example of the risk analysis equation.

$$\text{Risk Coefficient} = \text{CPU}*0.1 + \text{OS}*0.8 + \text{IP Address (most significant 16 bits)}*0.6 + \text{RTT}*10 + \text{Number of Hops}*5 \quad \text{(Expression 1)}$$

In the above Expression 1, CPU (central processing unit), OS, the IP address (most significant 16 bits), RTT (round-trip time) and the number of hops are parameters for the risk coefficient. Data items that are arbitrarily selected from among the data items included in the execution environment information and the proximity environment information are set as these parameters. Also, in the above Expression 1, "0.1", "0.8", "0.5", "10" and "5" are exemplary weight coefficients of the parameters.

Therefore, the policy agents (the risk calculation units shown in FIG. 1) can calculate the risk coefficient corresponding to the risk targeted for detection by selecting parameters associated with the risk targeted for detection from among the data items included in the execution environment information and the proximity environment information and setting weight coefficients of the parameters.

The risk coefficient may be calculated using the risk coefficient equation as follows. First, the specifics of the data items set as the parameters are compared between the own machine and another machine on a per-parameter basis. The value of each parameter is set to 0 (zero) when the specifics of the corresponding data item match between the two machines. The value of each parameter is set larger as the difference in the specifics of the corresponding data item between the two machines is larger. Once the values of the parameters have been set, the risk coefficient can be calculated by multiplying the values by the weight coefficients and summating the multiplied values.

When the risk coefficient is calculated in the above manner, the larger the difference in the specifics of parameters, the larger the calculated risk coefficient. Moreover, the larger the difference in the specifics of parameters with large weight coefficients, the larger the calculated risk coefficient. That is to say, the larger the calculated risk coefficient is, the more it can be determined that the environment of the own machine is different from the environment of another machine. In this way, a risky execution environment can be detected and controlled.

Furthermore, in the basic information, the data item "execution timing" holds a timing for acquiring the execution environment information or the proximity environment information and a timing for conducting the risk analysis. Also, the data item "risk coefficient threshold" holds a threshold that is used when determining a high risk in combination with the risk coefficient calculated using the risk analysis equation. To be more specific, when the risk coefficient is equal to or larger than this threshold, it can be determined that there is a risk. Moreover, the data item "exception information" holds information (exception information) relating to an exception rule for considering, for example, that there is no risk even when it has been determined that there is a risk.

[Execution Environment Information]

The execution environment information is described below with reference to FIGS. 4 and 5. FIG. 4 shows an example of execution environment information of a master machine used in the present embodiment. FIG. 5 shows an example of execution environment information of a slave machine used in the present embodiment.

As shown in FIGS. 4 and 5, the execution environment information includes, for example, "date and time", "hardware (H/W)", "OS", "network (N/W)" and "security policy" as data items.

The data item "date and time" holds the date and time when each machine acquired the execution environment information. The data item "H/W" holds information relating to hardware, such as information showing CPU, a memory, a hard disk drive (HDD), and either a virtual machine or a physical machine. The data item "OS" holds information relating to OS, such as the name, version and revision of OS. The data item "N/W" holds information relating to the network, such as an IP address, MAC and a domain.

The data item "security policy" holds information relating to a security policy, such as the name of a provider, a region and contract information. The "name of a provider" may show the name of a company, the name of a cloud provider, and the like. The "region" may show the name of a region in which each physical machine is located, such as Japan and the United States. The "contract information" may be information relating to the specifics of a contract concluded between a user and a cloud provider. The specifics of a contract may include, for example, whether or not a premium service with ensured security is provided, and whether or not a discount service without ensured security is provided.

[Proximity Environment Information]

The proximity environment information is described below with reference to FIGS. 6 to 9. FIGS. 6 to 9 show examples of the proximity environment information. FIG. 6 shows an example of proximity environment information of the own machine acquired by the slave machine 4. FIG. 7 shows an example of proximity environment information that is acquired from the slave machine 4 by another machine. FIG. 8 shows an example of proximity environment information that is acquired from the slave machine 5 by another machine. FIG. 9 shows an example of proximity environment information that is acquired from the slave machine 9 by another machine. Note that FIGS. 7 to 9 only show the proximity environment information with the latest date and time of acquisition out of pieces of proximity environment information accumulated in each machine.

As shown in FIG. 6, the proximity environment information that the slave machine 4 acquires from itself includes, for example, "date and time", "policy admin", "master distributed execution foundation", "policy agent in proximity", "executed task in proximity" and "RTT" as data items. Note that the proximity environment information shown in FIGS. 7 to 9, which is acquired from a slave machine by another machine, includes the same data items as the proximity environment information shown in FIG. 6 except for the data item "date and time".

The data item "date and time" holds the date and time when the proximity environment information was acquired. The data item "policy admin" holds information relating to a positional relationship with the policy admin $1b$, such as the number of hops to the admin machine and the average RTT to the admin machine. The data item "master distributed execution foundation" holds information relating to the master distributed execution foundation, such as the name of the policy agent in the master machine, the number of hops to the master machine, the average RTT to the master machine, the version of the master distributed execution foundation, and tasks executed by the master distributed execution foundation.

The data item "policy agent in proximity" holds information relating to policy agents in machines located in proximity. The data item "executed task in proximity" holds information relating to tasks executed by the policy agents located in proximity. The data item "RTT" holds the RTT to machines located in proximity.

Note that the execution environment information and the proximity environment information described above are stored as policy agent information in the storage unit 304 shown in FIG. 1 in each machine. FIG. 10 shows an example of policy agent information used in the present embodiment.

[Example of Calculation of Risk Coefficient]

The following describes a specific example of risk calculation performed by a policy agent (the risk calculation unit 305, see FIG. 1) with reference to FIG. 10. In the present embodiment, a policy agent, which functions as the risk calculation unit 305, can compare the execution environment information and the proximity environment information of the own machine with the execution environment information and the proximity environment information of other machines, and calculate a risk based on the result of the comparison. The specific example is as follows.

First, the policy agent (risk calculation unit 305) calculates a risk coefficient using the risk analysis equation included in the basic information, the execution environment information and the proximity environment information of the own machine, and the execution environment information and the proximity environment information of each of other machines. More specifically, the policy agent calculates risk coefficients in one-to-one correspondence with other machines. The policy agent then calculates the average value of the risk coefficients calculated in one-to-one correspondence with other machines. This average value of the risk coefficients serves as the risk.

For example, assume the case where the average value of the risk coefficients is calculated using the risk analysis equation of the above Expression 1 and the policy agent information shown in FIG. 10. In this case, under the proximity condition associated with the most significant 16 bits of IP addresses, a proximity machine group including the policy agents 4b to 9b is formed. CPU, OS, the IP address (the most significant 16 bits), RTT and the number of hops are used as parameters for the risk analysis equation.

Referring to FIG. 10, out of the parameters for the risk analysis equation, CPU, OS and the IP address (the most significant 16 bits) match among the policy agents 4b to 9b. However, the average RTT and the number of hops vary among the policy agents 4b to 9b.

To be more specific, as to the policy agent 9b, the average RTT and the number of hops are "100 ms" and "10", respectively. On the other hand, as to the policy agents 4b to 8b (not shown in FIG. 10) other than the policy agent 9b, the average RTT and the number of hops are "10 ms" and "5", respectively.

One of the reasons why the parameters vary among the policy agents 4b to 9b in the above manner is that, out of the virtual machines 4 to 9 that belong to the same cloud provider, the settings of the virtual machine 9 are erroneous and therefore the virtual machine 9 operates under the execution environment different from the execution environment of other virtual machines 4 to 8.

According to the example shown in FIG. 10, while the average value of the risk coefficients calculated by the policy agent 9b in the virtual machine 9 is large, the average value of the risk coefficients calculated by the policy agents 4b to 8b in the virtual machines 4 to 8 is small.

Thereafter, each policy agent (risk determination unit 306) determines whether or not the calculated average value of the risk coefficients is equal to or larger than the risk coefficient threshold included in the basic information.

When it is determined that the average value of the risk coefficients is equal to or larger than the threshold, each policy agent (execution control unit 307) instructs the distributed execution foundation in the own machine to stop the execution of the task. On the other hand, when it is determined that the average value of the risk coefficients is smaller than the threshold, each policy agent (execution control unit 307) permits the distributed execution foundation in the own machine to execute the task.

[System Operations]

Figure 11:
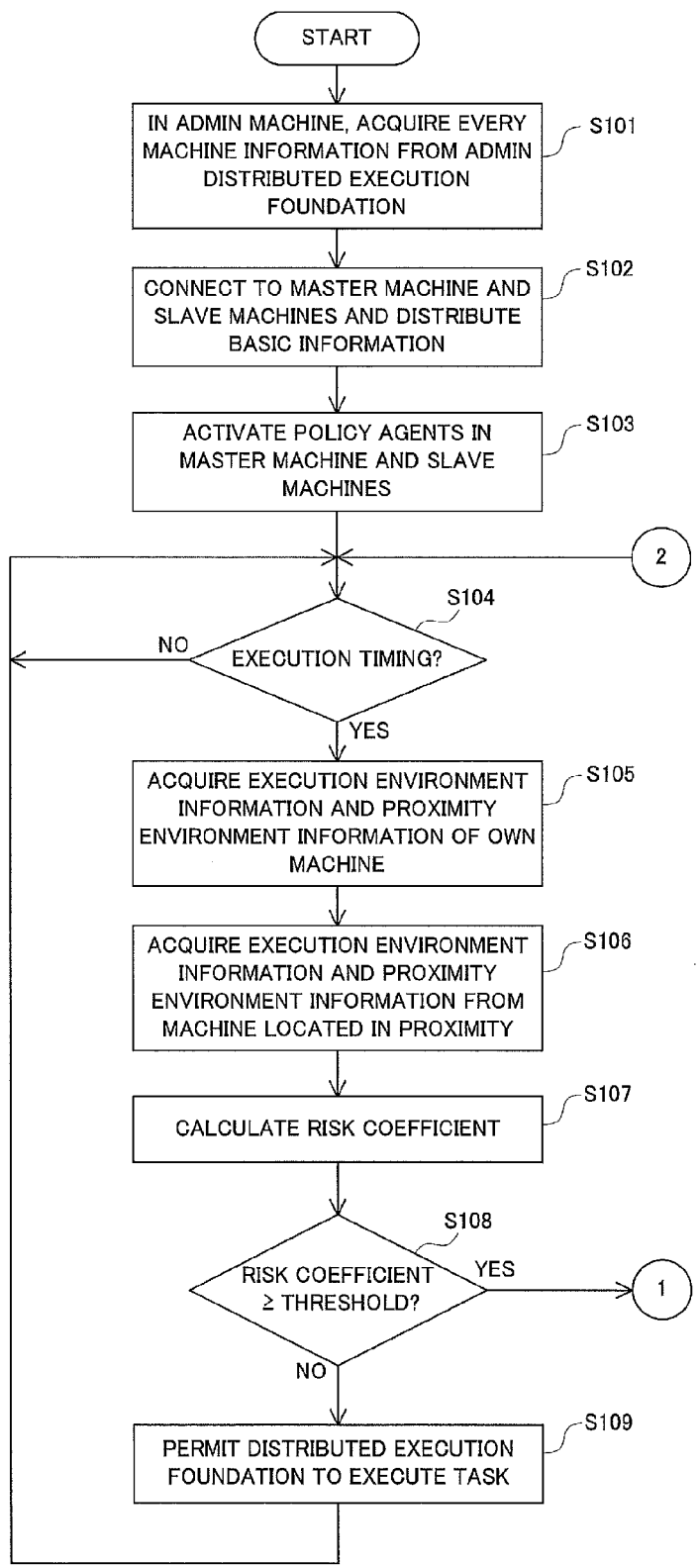
FIG. 11 is a flow diagram showing examples of steps executed in the first half of the entire operations of a distributed processing system according to the embodiment.
Figure 12:
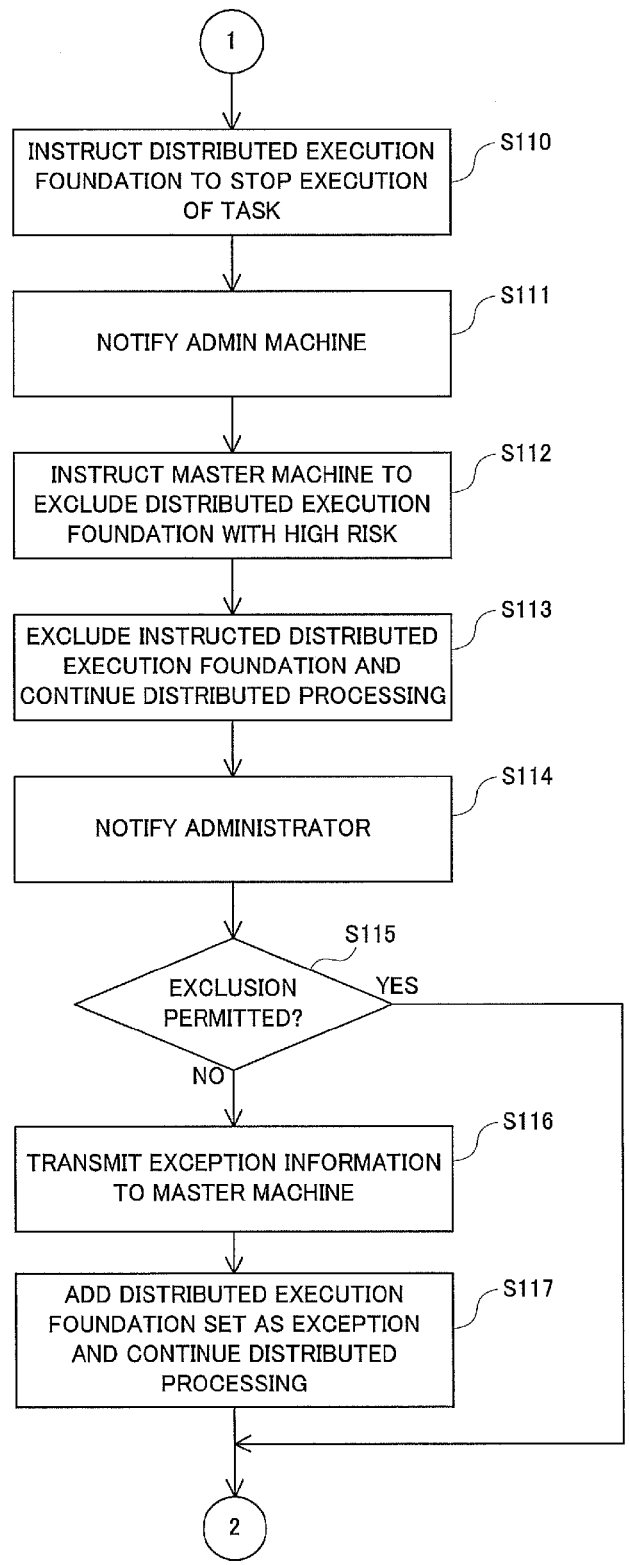
FIG. 12 is a flow diagram showing examples of steps executed in the second half of the entire operations of a distributed processing system according to the embodiment.

The following describes system operations for the case where the distributed processing system 100 according to the present embodiment executes distributed processing with reference to FIGS. 11 and 12. FIGS. 11 and 12 are flow diagrams showing an example of operations of a distributed processing system according to the present embodiment. FIG. 11 shows steps S101 to S109 of the entire operations of the distributed processing system, and FIG. 12 shows steps S110 to S117 of the entire operations of the distributed processing system.

FIGS. 1 to 10 shall be referred to where appropriate in the following description. In the present embodiment, the distributed processing method is implemented by causing the distributed processing system to operate. Therefore, the following description of the operations of the distributed processing system applies to the distributed processing method according to the present embodiment.

As shown in FIG. 11, in the admin machine 1, the policy admin 1b first accesses the admin distributed execution foundation 1a and acquires machine information of the master distributed execution foundation 2a and the slave distributed execution foundations 3a to 9a (step S101).

The policy admin 1b then connects to the master machine 2 and the slave machines 3 to 9 using the acquired machine information and distributes the basic information (step S102).

Next, in each of the master machine 2 and the slave machines 3 to 9, the management module (management unit 301) stores the received basic information in the storage device (storage unit 304) and activates corresponding one of the policy agents 2b to 9b based on the basic information (step S103).

Thereafter, in each of the master machine 2 and the slave machines 3 to 9, the management module determines whether or not the current time is the execution timing included in the basic information (step S104). In any machine in which the current time is not determined to be the execution timing in step S104 (the NO branch of step S104), the management module stands by until the execution timing.

On the other hand, in any machine in which the current time is determined to be the execution timing in step S104 (the YES branch of step S104), the policy agent (information acquisition unit 303) acquires the execution environment information and the proximity environment information of the own machine and stores the acquired information in the storage device (storage unit 304) (step S105). Note that data of the execution environment information and the proximity environment information acquired by the policy agent in step S105 is equivalent to the data items set in the basic information.

In any machine that has executed step S105, the policy agent (communication unit 302) identifies a machine located in proximity that satisfies the proximity condition included in the basic information, acquires the execution environment information and the proximity environment information of the identified machine located in proximity, and stores the acquired information in the storage device (storage unit 304) (step S106). Note that data of the execution environment information and the proximity environment information acquired by the policy agent in step S105 is equivalent to the data items set in the basic information.

In any machine that has executed steps S105 and S106, the policy agent (risk calculation unit 305) calculates the risk coefficient (average value) using the policy agent information (see FIG. 10) composed of the execution environment information and the proximity environment information acquired in steps S105 and S106 and the risk analysis equation included in the basic information (step S107).

In any machine that has executed steps S105 to S107, the policy agent (risk determination unit 306) determines whether or not the calculated risk coefficient is equal to or larger than the risk coefficient threshold included in the basic information (step S108).

In any machine in which the risk coefficient is not determined to be equal to or larger than the threshold in step S108 (the NO branch of step S108), the policy agent (execution control unit 307) permits the distributed execution foundation in the own machine to execute the task (step S109). Thereafter, the aforementioned step S104 is executed again.

On the other hand, in any machine in which the risk coefficient is determined to be equal to or larger than the threshold in step S108 (the YES branch of step S108), the policy agent (execution control unit 307) instructs the distributed execution foundation (processing execution unit 308) in the own machine to stop the execution of the task (step S110) as shown in FIG. 12.

In any machine that has executed step S110, the policy agent (communication unit 302) notifies the admin machine 1 that the risk coefficient is large (step S111).

After step S111 has been executed, the admin machine 1 instructs the master machine 2 to exclude the distributed execution foundation in the slave machine with the large risk coefficient from a group of slave distributed execution foundations that are designated to execute tasks (step S112).

Thereafter, in the master machine 2, the distributed execution foundation 2a excludes the instructed slave distributed execution foundation from the group of slave distributed execution foundations that are designated to execute tasks, and continues the distributed processing using the group of remaining slave distributed execution foundations (step S113).

Subsequently, the admin machine 1 notifies the terminal of the administrator of the exclusion of the slave distributed execution foundation (step S114).

The administrator who has received the notification via the terminal checks the statuses of the distributed execution foundations. When a problem has been found, the administrator corrects configuration information and inputs an instruction for permitting the exclusion of the corresponding slave distributed execution foundation to the admin machine 1. On the other hand, when no problem has been found, the administrator registers, for example, information indicating that the slave distributed execution foundation targeted for the exclusion should be used as-is with the exception information included in the basic information, and inputs an instruction for not permitting the exclusion of the corresponding slave to the admin machine 1.

Thereafter, the admin machine 1 determines whether or not the input from the administrator permits the exclusion of the corresponding slave distributed execution foundation (step S115). When the result of the determination in step S115 shows that the instruction input from the administrator permits the exclusion (the YES branch of step S115), the processing of the admin machine 1 is completed. Subsequently, the aforementioned step S104 is executed again.

On the other hand, when the result of the determination in step S115 shows that the instruction input from the administrator does not permit the exclusion (the NO branch of step S115), the admin machine 1 transmits the exception information to the master machine 2 (step S116).

Thereafter, the distributed execution foundation 2a in the master machine 2 adds the slave distributed execution foundation set in the exception information to the group of slave distributed execution foundations and continues the distributed processing (step S117). Subsequently, the aforementioned step S104 is executed again.

As described above, step S104 is executed again after the execution of step S109, after the YES branch of step S115, and after the execution of step S117. That is to say, the distributed processing system 100 executes steps S104 to S117 repeatedly. It should be noted that the distributed processing system 100 ends the processing when, for example, receiving an external instruction for ending the processing.

Effects of Embodiment

As described above, the distributed processing system 100 according to the present embodiment dynamically checks the execution environment and the proximity environment of each machine. When a risky execution environment has been detected, the detected risky execution environment is isolated and the execution of the distributed task is prohibited. Therefore, the distributed processing system 100 can prevent unintended leakage of data and breach of security policies.

Furthermore, in the present embodiment, a region and a contract can be set as parameters for the risk analysis equation. Therefore, for example, in the case where a large number of machines are used, a risky execution environment can be detected and controlled even when a fraudulent execution environment has been added due to erroneous settings, bugs, etc.

Moreover, in the present embodiment, the risk analysis equation can be set for each task and each security policy. Therefore, a risky execution environment can be detected and controlled even when there are a plurality of tasks and a plurality of security policies.

In addition, in the present embodiment, the execution environment information and the proximity environment information can be periodically acquired from each machine and compared. Therefore, a risky execution environment can be detected and controlled even with the use of a virtual machine that has a possibility of being dynamically moved between machines due to, for example, live migration.

Also, as the risk can be analyzed upon start of a task, even when executing batch processing including a plurality of tasks, a risky execution environment can be detected and controlled for each task.

In addition, as the risk can be analyzed for each machine, even under the environment where a large number of machines are used, the risk can be analyzed efficiently.

Furthermore, only a machine with a high risk can be excluded, and the distributed processing can be continued using a group of machines with a low risk. Accordingly, the distributed processing can be executed efficiently.

Moreover, by conducting the risk analysis with respect to machines located in proximity that satisfy the proximity condition, the risk coefficients can be calculated from a group with a certain level of homogeneousness. This can improve the accuracy of the risk analysis.

Modification Examples

The above embodiment is merely an example and should not exclude application of various types of modifications and techniques that are not defined in the above embodiment. That is to say, the present invention can be embodied with various modifications without departing from the concept thereof.

For example, in the above embodiment, the risk coefficient is calculated using the risk analysis equation. Here, conditions such as an exception condition and an absolute condition may be defined by the risk analysis equation. For example, prior to conducting the risk analysis, a condition "region=Japan" may be set. In this case, if the region of the own machine is not Japan, the distributed processing system 100 can immediately cease operations.

In the above Embodiment, the execution environment information and the proximity environment information are acquired each time the risk analysis is conducted. Alternatively, the distributed processing system 100 may conduct the risk analysis using a history of the execution environment information and the proximity environment information. For example, the distributed processing system 100 may store various types of information associated with the past execution of tasks with a low risk. If these various types of information have not changed, the distributed processing system 100 may determine that the risk is low and execute the tasks. In this case, when there is no history information, the distributed processing system 100 may either determine that the risk is low or inquire the administrator by necessity.

In the above embodiment, the risk analysis is conducted at an interval of a predetermined time period. Alternatively, the risk analysis may be conducted at any timing. For example, the risk analysis may be conducted whenever the administrator wishes to check, such as when new tasks are distributed and when detecting a change in the operational environments due to live migration.

Furthermore, the risk analysis may be conducted on a per-task basis. For example, the risk coefficient threshold may be set large for a task with a low risk. The execution environment for a task that must not be leaked to the outside may be set so that the task cannot be executed outside before conducting the risk analysis. Furthermore, statistical processing may be executed as the risk analysis using standard deviation, errors, etc.

[Program]

Figure 13:
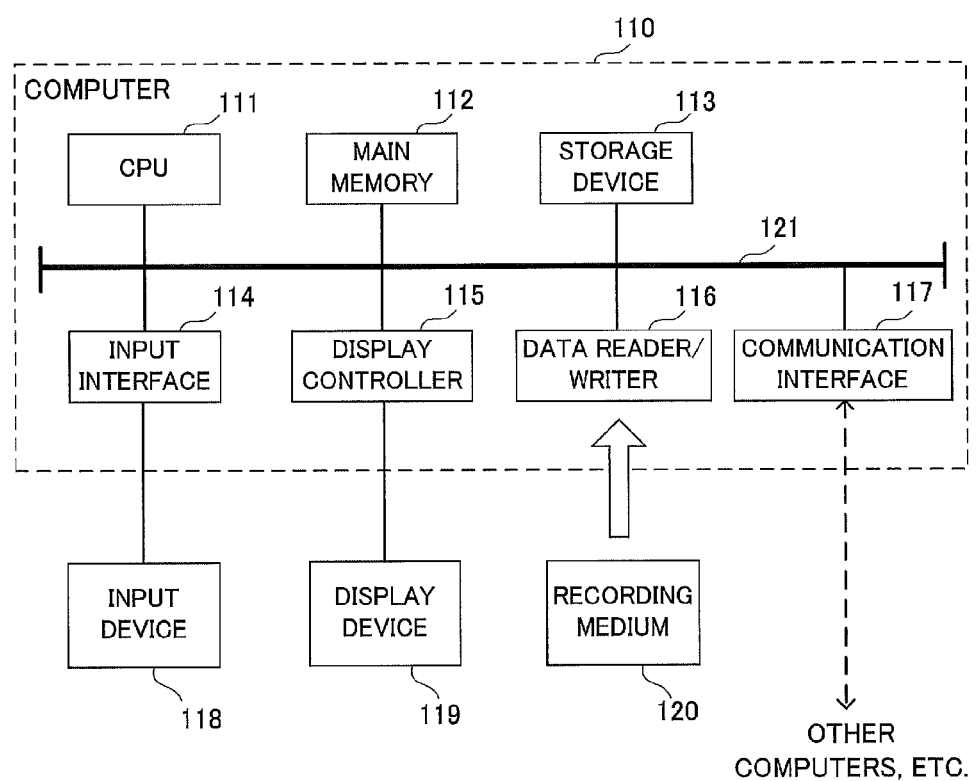
FIG. 13 is a block diagram showing an example of a computer that realizes machines according to the embodiment.

It suffices for a program according to an embodiment of the present invention to cause a computer to execute steps S103 to S109 shown in FIG. 12 and steps S110 and S111 shown in FIG. 13. By installing and executing this program on the computer, the master machine 2 and the slave machines 3 to 9 according to the present embodiment can be realized. In this case, a central processing unit (CPU) of the computer functions as and executes processing of the management unit 301, the communication unit 302, the information acquisition unit 303, the risk calculation unit 305, the risk determination unit 306, the execution control unit 307 and the processing execution unit 308. Furthermore, in the present embodiment, a storage device provided in the computer, such as a hard disk, functions as the storage unit 304.

A description is now given of a computer that can realize the master machine 2 and the slave machines 3 to 9 by executing a program according to the present embodiment with reference to FIG. 13. FIG. 13 is a block diagram showing an example of a computer that realizes machines according to the present embodiment. Note that the computer shown in FIG. 13 may be either a physical machine or a virtual machine.

As shown in FIG. 13, a computer 110 includes a CPU 111, a main memory 112, a storage device 113, an input interface 114, a display controller 115, a data reader/writer 116 and a communication interface 117. These components are connected by a bus 121 in such a manner that they can perform data communication with one another.

The CPU 111 executes various types of arithmetic processing by deploying programs (codes) according to the present embodiment stored in the storage device 113 to the main memory 112 and executing them in a predetermined order. The main memory 112 is typically a volatile storage device such as a dynamic random-access memory (DRAM). The program according to the present embodiment is provided while being stored in a computer-readable recording medium 120. The program according to the present embodiment may be distributed over the Internet connected via the communication interface 117.

Specific examples of the storage device 113 include a hard disk drive and a semiconductor storage device such as a flash memory. The input interface 114 mediates data transmission between the CPU 111 and an input device 118 such as a keyboard and a mouse. The display controller 115 is connected to a display device 119 and controls display on the display device 119.

The data reader/writer 116 mediates data transmission between the CPU 111 and the recording medium 120. Specifically, the data reader/writer 116 reads programs from the recording medium 120 and writes the result of processing executed by the computer 110 to the recording medium 120. The communication interface 117 mediates data transmission between the CPU 111 and other computers.

Specific examples of the recording medium 120 include a general-purpose semiconductor storage device such as CompactFlash (CF, registered trademark) and Secure Digital (SD), a magnetic storage medium such as a flexible disk, and an optical storage medium such as a Compact Disc read-only memory (CD-ROM).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A distributed processing system including a plurality of machines that perform distributed execution of a task, the plurality of machines including a master machine and slave machines, the master machine distributes tasks to the slave machines, each machine comprising:

a hardware processor that acquires environment information relating to an environment of another machine;

acquires environment information relating to an environment of its own machine;

calculates a risk for a case where its own machine executes the task based on the acquired environment information of said another machine and the acquired environment information of its own machine;

determines whether or not the calculated risk is equal to or higher than a predetermined threshold; and stops execution of the task on its own machine when the risk determination unit determines that the risk is equal to or higher than the predetermined threshold, wherein the risk is calculated by comparing the environment information of its own machine with the environment information of said another machine to determine risk coefficients for each other machine executing the task and a risk coefficient for its own machine executing the task, wherein each slave machine determines the risk coefficient for each other slave machine executing the task and the risk coefficient for its own machine executing the task, and wherein the environment information includes execution environment information and proximity environment information, wherein the execution environment information includes data items representing at least one of date and time, hardware, operating system, network and security policy, and the proximity environment information includes data items representing at least one of date and time, policy administrator, master distributed execution foundation, policy agent in proximity, executed task in proximity and round-trip times, and wherein determining the risk coefficients includes using at least one data item of the execution environment information, and at least one data item of the proximity environment information.

2. The distributed processing system according to claim 1, wherein any of the plurality of machines is a virtual machine constructed by cloud computing.

3. The distributed processing system according to claim 1, wherein the environment information is acquired either each time execution of the task is started or periodically.

4. The distributed processing system according to claim 1, wherein the execution environment information includes information relating to a security policy.

5. A distributed processing method for performing distributed execution of a task using a plurality of machines, the plurality of machines including a master machine and slave machines, the master machine distributes tasks to the slave machines, comprising:

(a) a step in which each of the plurality of machines acquires environment information relating to an environment of another machine;

(b) a step in which each of the plurality of machines acquires environment information relating to an environment of itself;

(c) a step in which each of the plurality of machines calculates a risk for a case where the machines themselves execute the task based on the environment information acquired in step (a) and the environment information acquired in step (b);

(d) a step in which each of the plurality of machines determines whether or not the risk calculated in step (c) is equal to or higher than a predetermined threshold; and (e) a step in which each of the plurality of machines stops execution of the task on itself when step (d) determines that the risk is equal to or higher than the predetermined threshold, wherein for each of the plurality of machines step (c) calculates the risk by comparing the environment information of said another machine acquired in step (a) with the environment information of itself acquired in step (b), and wherein the environment information of said another machine includes execution environment information and proximity environment information, wherein each slave machine determines a risk coefficient for each other slave machine executing the task and a risk coefficient for its own machine executing the task, wherein the execution environment information includes data items representing at least one of date and time, hardware, operating system, network and security policy, and the proximity environment information includes data items representing at least one of date and time, policy administrator, master distributed execution foundation, policy agent in proximity, executed task in proximity and round-trip times, and wherein determining the risk coefficients includes using at least one data item of the execution environment information, and at least one data item of the proximity environment information.

6. The distributed processing method according to claim 5, wherein any of the plurality of machines is a virtual machine constructed by cloud computing.

7. The distributed processing method according to claim 5, wherein steps (a) and (b) are executed either each time execution of the task is started or periodically.

8. The distributed processing method according to claim 5, wherein
the execution environment information includes information relating to a security policy.

9. A non-transitory computer readable storage medium having recorded therein a program for, when performing distributed execution of a task using a plurality of computers, causing one of the plurality of computers to execute the divided task, the plurality of computers including a master computer and slave computers, the master computer distributes the task to the slave computers, the program including an instruction for causing said one of the plurality of computers to execute:

(a) a step of acquiring environment information relating to an environment of another computer;

(b) a step of acquiring environment information relating to an environment of said one of the plurality of computers;

(c) a step of calculating a risk for a case where said one of the plurality of computers executes the task based on the environment information acquired in step (a) and the environment information acquired in step (b);

(d) a step of determining whether or not the calculated risk is equal to or higher than a predetermined threshold; and (e) a step of stopping execution of the task on said one of the plurality of computers when step (d) determines that the risk is equal to or higher than the predetermined threshold, wherein step (c) calculates the risk by comparing the environment information of said another computer acquired in step (a) with the environment information of said one of the plurality of computers acquired in step (b), and wherein the environment information of said another computer includes execution environment information and proximity environment information, wherein each slave computer determines a risk coefficient for each other slave computer executing the task and a risk coefficient for its own computer executing the task, wherein the execution environment information includes data items representing at least one of date and time, hardware, operating system, network and security policy, and the proximity environment information includes data items representing at least one of date and time, policy administrator, master distributed execution foundation, policy agent in proximity, executed task in proximity and round-trip times, and wherein the determining the risk coefficients includes using at least one data item of the execution environment information, and at least one data item of the proximity environment information.

10. The non-transitory computer readable storage medium according to claim 9, wherein
any of the plurality of computers is a virtual machine constructed by cloud computing.

11. The non-transitory computer readable storage medium according to claim 9, wherein
steps (a) and (b) are executed either each time execution of the task is started or periodically.

12. The non-transitory computer readable storage medium according to claim 9, wherein the execution environment information includes information relating to a security policy.

* * * * *